(12) United States Patent
Muro et al.

(10) Patent No.: US 6,823,107 B2
(45) Date of Patent: Nov. 23, 2004

(54) METHOD AND DEVICE FOR OPTICAL AMPLIFICATION

(75) Inventors: Shinichirou Muro, Kawasaki (JP); Etsuko Hayashi, Kawasaki (JP); Yasushi Sugaya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 332 days.

(21) Appl. No.: 10/093,820

(22) Filed: Mar. 11, 2002

(65) Prior Publication Data

US 2003/0063850 A1 Apr. 3, 2003

(30) Foreign Application Priority Data

Sep. 28, 2001 (JP) ........................................ 2001-301951

(51) Int. Cl.[7] .............................................. G02B 6/26
(52) U.S. Cl. .................................... 385/27; 359/334.31
(58) Field of Search ........................ 385/15–17, 24–27, 385/37; 359/334, 334.31, 334.33, 337.4, 337.11, 337.5

(56) References Cited

U.S. PATENT DOCUMENTS

| | | | | |
|---|---|---|---|---|
| 6,172,803 B1 | * | 1/2001 | Masuda et al. | 359/337.12 |
| 6,188,508 B1 | * | 2/2001 | Horiuchi et al. | 359/334 |
| 6,292,288 B1 | * | 9/2001 | Akasaka et al. | 359/334 |
| 6,335,821 B1 | * | 1/2002 | Suzuki et al. | 359/337.11 |
| 6,373,625 B1 | * | 4/2002 | Kobayashi et al. | 359/341.41 |
| 6,433,921 B1 | * | 8/2002 | Wu et al. | 359/334 |
| 6,490,077 B1 | * | 12/2002 | Conradi | 359/334 |
| 6,529,315 B2 | * | 3/2003 | Bartolini et al. | 359/334 |
| 6,693,740 B2 | * | 2/2004 | Gray et al. | 359/337.4 |

FOREIGN PATENT DOCUMENTS

| | | |
|---|---|---|
| JP | 2000-330145 | 11/2000 |
| JP | 2001-015845 | 1/2001 |

* cited by examiner

Primary Examiner—Gregory J. Toatley, Jr.
Assistant Examiner—Sang H. Nguyen
(74) Attorney, Agent, or Firm—Staas & Halsey LLP

(57) ABSTRACT

The present invention relates to a device for optical amplification, and a primary object of the present invention is to provide a method and device for optical amplification which can maintain the wavelength characteristic of gain constant and can obtain a wide input dynamic range. The device according to the present invention includes a first optical amplifying unit having a Raman amplifying medium and a first pump source for pumping the Raman amplifying medium, and a second optical amplifying unit optically connected to a rear stage of the first optical amplifying unit. The second optical amplifying unit has an optical amplifying medium and second pump sources for pumping the optical amplifying medium. The present invention is characterized by a control unit for controlling the gain of the first optical amplifying unit so that variations in output power of the first optical amplifying unit due to variations in input power of the first optical amplifying unit are canceled.

22 Claims, 16 Drawing Sheets

OUTPUT SPECTRUM OF
FIRST OPTICAL AMPLIFYING UNIT 13

BACKWARD SPONTANEOUS RAMAN
SCATTERING LIGHT SPECTRUM

PASSBAND OF BANDPASS FILTER 31

PREFERRED EMBODIMENT
SHOWN IN FIG.1

PREFERRED EMBODIMENT
SHOWN IN FIG.7

METHOD AND DEVICE FOR OPTICAL AMPLIFICATION

BACKGROUND OF THE INVENTION

1. Field of the Invention

The present invention relates to a method and device for optical amplification.

2. Description of the Related Art

An optical communication system using an optical fiber transmission line is used to transmit a relatively large amount of information. A low-loss (e.g., 0.2 dB/km) optical fiber has already been produced and is being used as the optical fiber transmission line. In addition, an optical amplifier for compensating for loss in the optical fiber transmission line is used to allow long-haul transmission.

A conventional optical amplifier includes an optical amplifying medium pumped by pump light to provide a gain band. The optical amplifying medium and the pump light are selected so as to provide a gain band including the wavelength of signal light to be amplified. As a result, the signal light is amplified during propagation in the optical amplifying medium being pumped.

For example, an erbium doped fiber amplifier (EDFA) includes an erbium doped fiber (EDF) as the optical amplifying medium, and a pump source for pumping the EDF. The pump source supplies pump light having a predetermined wavelength to the EDF. By presetting the wavelength of the pump light within a 0.98 $\mu$m band or 1.48 $\mu$m band, a gain band including a wavelength band of 1.55 $\mu$m can be obtained. As a result, signal light having a wavelength band of 1.55 $\mu$m is amplified.

As a technique for increasing a transmission capacity by a single optical fiber, wavelength division multiplexing (WDM) is known. In a system adopting WDM, a plurality of optical carriers having different wavelengths are individually modulated by data. Each modulated carrier provides one channel of a WDM system for transmitting optical signals. These optical signals (i.e., the modulated carriers) are wavelength division multiplexed by an optical multiplexer to obtain WDM signal light. The WDM signal light thus obtained is transmitted through an optical fiber transmission line to a receiving end. At the receiving end, the WDM signal light is separated into individual optical signals by an optical demultiplexer. Then, the original data can be detected according to these individual optical signals. Accordingly, by applying WDM, the transmission capacity in a single optical fiber can be increased according to the number of WDM channels.

In the case that an optical amplifier is inserted in a transmission line of an optical communication system adopting WDM, a transmission distance is limited by the noise characteristic of the optical amplifier and by the wavelength characteristic of gain which is represented by a gain tilt or gain deviation. In an EDFA, for example, a practical amplification band is present in a band of 1530 to 1610 nm, and a gain tilt is produced near this amplification band. It is known that this gain tilt varies with the total input power of signal light to the EDFA and the power of pump light.

To compensate the wavelength characteristic of gain of an optical amplifier, an optical filter is used as an equalizer. However, when the average gain of the optical amplifier is changed, the wavelength characteristic of gain largely changes. It is therefore necessary to perform control such that the gain becomes constant at a gain point where the optical filter is fabricated.

In an optical communication system, optical fiber transmission lines of various lengths are provided. Accordingly, the power of signal light to be input into an optical amplifier used as an optical repeater is not constant. It is therefore required to provide an optical amplifier which can support a wide input power dynamic range. Further, there is a case that a dispersion compensating fiber for compensating dispersion generated in an optical fiber transmission line is used. In this case, it is also necessary to change a level diagram in an optical repeater according to variations in loss in the dispersion compensating fiber.

In such gain control that the gain of an optical amplifier becomes constant as mentioned above, the power of output signal light changes with a change in the power of input signal light. However, the power of output signal light allowed to be supplied to an optical fiber transmission line downstream of the optical amplifier is limited by various nonlinear effects. Therefore, it is desirable that the output power from the optical amplifier is constant.

In these circumstances, there has been developed an optical amplifying device for maintaining the wavelength characteristic of gain constant and obtaining a wide input dynamic range. This optical amplifying device includes first and second optical amplifiers and a variable optical attenuator optically connected between the first and second optical amplifiers. Automatic gain control (AGC) is applied to each of the first and second optical amplifiers, thereby maintaining constant the wavelength characteristic of gain of each of the first and second optical amplifiers. Further, automatic output level control (ALC) is performed to the second optical amplifier by using the variable optical attenuator to thereby obtain a wide input dynamic range. That is, the output level of the second optical amplifier is maintained constant irrespective of the input level of the first optical amplifier, so that the input dynamic range of this optical amplifying device is widened.

However, this type of optical amplifying device is disadvantageous from the viewpoints of efficiency and noise characteristics, because undue loss is given by the variable optical attenuator. Particularly in the case that the amount of dispersion compensation is large, a dispersion compensating fiber having a length of ten and more kilometers is necessary. In this case, it is considered that a loss of about 20 dB may be incurred as the sum of the loss by the dispersion compensating fiber and the input dynamic range, causing a large degradation in efficiency of an amplifier repeater.

Further, with higher transmission speeds in recent years, the influences by nonlinear effects (self-phase modulation, cross-phase modulation, etc.) have become apparent as the cause of degradation in error rate. Particularly in the case that the transmission speed is 40 Gbit/s or more, it is necessary to minimize the influences by the nonlinear effects to signal light. In a repeater, the nonlinearity caused in a dispersion compensating fiber is large, so that it is necessary to reduce the power of signal light to be input into the dispersion compensating fiber, resulting in a degradation in noise figure in the repeater.

Further, there has been proposed a Raman amplifier having a Raman amplifying medium and a plurality of pump sources for pumping the Raman amplifying medium at different wavelengths, for the purpose of broadening the amplification band for signal light. As a method of controlling the wavelength characteristic of gain in the Raman amplifier, it is known that a monitor for monitoring the wavelength characteristic of optical transmission power of signal light passed through the Raman amplifying medium is used to feed back the result of this monitoring to each pump source, thereby controlling the wavelength characteristic of gain (Japanese Patent Laid-open No. 2001-15845).

SUMMARY OF THE INVENTION

In this method, however, it is necessary to correct for the power of interchannel crosstalk and spontaneous Raman scattering light in the monitored optical power, so there is a problem in control. Furthermore, it is necessary to use a spectrum analyzer for monitoring the signal light with high accuracy, inviting a disadvantage from the viewpoint of cost.

It is therefore an object of the present invention to provide a method and device for optical amplification which can maintain the wavelength characteristic of gain constant and can obtain a wide input dynamic range, thereby improving the amplification efficiency and noise characteristics. Other objects of the present invention will become apparent from the following description.

In accordance with an aspect of the present invention, there is provided a device comprising a first optical amplifying unit, a second optical amplifying unit, and a control unit. The first optical amplifying unit comprises a Raman amplifying medium and a first pump source for pumping the Raman amplifying medium. The second optical amplifying unit is optically connected to a rear stage of the first optical amplifying unit, and comprises an optical amplifying medium and a second pump source for pumping the optical amplifying medium. The control unit controls the gain of the first optical amplifying unit so that variations in output power of the first optical amplifying unit due to variations in input power of the first optical amplifying unit are canceled.

With this configuration, variations in output power of the first optical amplifying unit are canceled, so that the gain of the second optical amplifying unit can be maintained constant. Accordingly, the wavelength characteristic of gain of the whole device can be easily maintained constant, and a wide input dynamic range can be obtained. Moreover, the attenuation of a variable optical attenuator that may be sometimes provided between the first optical amplifying unit and the second optical amplifying unit can be reduced or nullified by the above control, thereby allowing the improvement in amplification efficiency and in noise characteristics.

In accordance with another aspect of the present invention, there is provided a method for optical amplification. This method is a method using the device according to the present invention. More specifically, the method according to the present invention comprises the steps of amplifying signal light by a first optical amplifying unit comprising a Raman amplifying medium and a first pump source for pumping the Raman amplifying medium; amplifying signal light output from the first optical amplifying unit by a second optical amplifying unit comprising an optical amplifying medium and a second pump source for pumping the optical amplifying medium; and controlling the gain of the first optical amplifying unit so that variations in output power of the first optical amplifying unit due to variations in input power of the first optical amplifying unit are canceled.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Some preferred embodiments of the present invention will now be described in detail with reference to the attached drawings.

Figure 1:
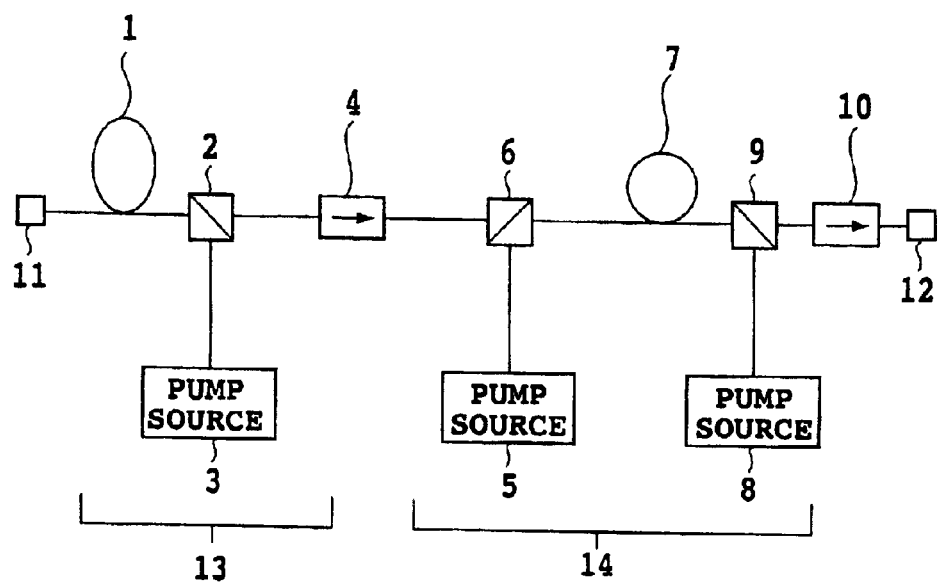
FIG. 1 is a block diagram showing a first preferred embodiment of the device for optical amplification according to the present invention.

Referring to FIG. 1, there is shown a first preferred embodiment of the device for optical amplification according to the present invention. This device includes a Raman amplifying medium 1, optical coupler 2, pump source 3, optical isolator 4, pump source 5, optical coupler 6, EDF (erbium doped fiber as a rare earth doped fiber) 7, pump source 8, optical coupler 9, and optical isolator 10. The Raman amplifying medium 1 has a first end connected to an input port 11 and a second end connected to the optical coupler 2. The pump source 3 and an input end of the optical isolator 4 are also connected to the optical coupler 2. An output end of the optical isolator 4 and the pump source 5 are connected to the optical coupler 6. The EDF 7 has a first end connected to the optical coupler 6 and a second end connected to the optical coupler 9. The pump source 8 and an input end of the optical isolator 10 are also connected to the optical coupler 9. An output end of the optical isolator 10 is connected to an output port 12.

A dispersion compensating fiber or a highly nonlinear fiber may be used as the Raman amplifying medium 1. In the case of using a dispersion compensating fiber as the Raman amplifying medium 1, the dispersion compensating fiber compensates for the chromatic dispersion and dispersion slope of an optical fiber transmission line.

The wavelength of signal light to be amplified is selected from the S-band (1450 to 1530 nm), C-band (1530 to 1570 nm), and L-band (1570 to 1610 nm), for example. In each case, the wavelength of pump light from the pump source 3 is set shorter than the band of the signal light by about 100 nm (about 13 THz). The wavelength of the pump light from the pump source 3 may be single or multiple.

The signal light to be amplified propagates from the input port 11 toward the output port 12. The pump light output from the pump source 3 is supplied through the optical coupler 2 into the Raman amplifying medium 1 from its second end and propagates toward the first end of the Raman amplifying medium 1. In the case that the wavelength of the pump light from the pump source 3 is multiple, each wavelength can provide a Raman amplification band at a wavelength longer by a Raman Stokes shift, thereby broadening the amplification band.

The wavelength of pump light from the pump source 5 is set to 980±5 nm, for example. The pump light output from the pump source 5 is supplied through the optical coupler 6 into the EDF 7 from its first end and propagates toward the second end of the EDF 7. The wavelength of pump light from the pump source 8 is set to 1480±10 nm, for example. The pump light output from the pump source 8 is supplied through the optical coupler 9 into the EDF 7 from its second end and propagates toward the first end of the EDF 7.

The EDF 7 as a rare earth doped fiber is suitable for amplification of signal light in the C-band. The rare earth element as a dopant in the rare earth doped fiber may be selected according to the wavelength of signal light to be amplified.

In this preferred embodiment, the Raman amplifying medium 1, the optical coupler 2, and the pump source 3 constitute a first optical amplifying unit 13. The pump source 5, the optical coupler 6, the EDF 7, the pump source 8, and the optical coupler 9 constitute a second optical amplifying unit 14. The optical isolators 4 and 10 are provided to prevent the oscillation due to a reflector structure formed in an optical path including an optical amplifying medium.

When the power of signal light supplied to the input port 11 varies, the gain in the first optical amplifying unit 13 is controlled to thereby maintain constant the power of signal light to be supplied to the second optical amplifying unit 14. The second optical amplifying unit 14 is used to obtain a high output power. It is preferable to perform gain fixing control so that the wavelength dependence of gain is not changed.

Particularly in the case of amplifying wavelength division multiplexing (WDM) signal light, it is preferable that multiple wavelengths are used as the operating wavelength of the pump source 3 to control the output level of each optical signal of the WDM signal light, thereby maintaining the level of each optical signal to be input to the second optical amplifying unit 14 at a predetermined constant level.

The predetermined constant level mentioned above means that the output levels in all the wavelength channels are equal to each other or that there is a level deviation between the wavelength channels. However, even in the case that the level deviation is present, the level of each optical signal to be input to the second optical amplifying unit 14 is preferably controlled to become constant irrespective of variations in input level of signal light to the first optical amplifying unit 13.

Figure 2:
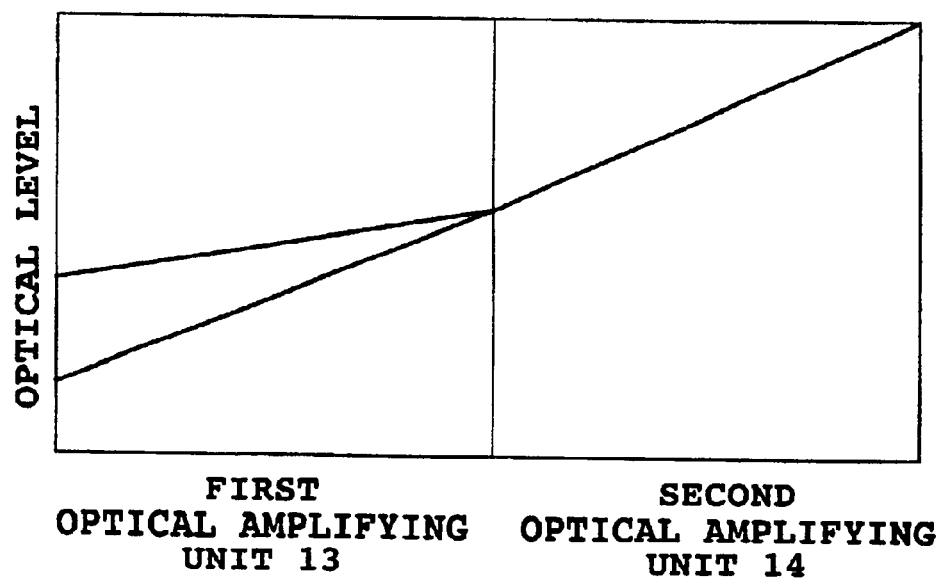
FIG. 2 is a level diagram in the device shown in FIG. 1.

Referring to FIG. 2, there is shown a level diagram in the device shown in FIG. 1. The level diagram indicates that variations in power of signal light input to this device are absorbed by gain control of the first optical amplifying unit 13 and that the second optical amplifying unit 14 is operated under gain fixing control. In the case that the optical fiber transmission line is an SMF (single-mode fiber) having a length of 100 km, the length of a dispersion compensating fiber required for a repeater becomes about 20 km. In the case that this dispersion compensating fiber is used as the Raman amplifying medium 1 (see FIG. 1), a pump light power of about 400 mW is required to support a loss (about 12 dB) of the dispersion compensating fiber and an input dynamic range of 7 dB (C-band, 44 channels, input power of −17 to −10 dBm/ch). To the contrary, a pump light power of about 800 mW at the maximum is sometimes required in the prior art. This will now be described more specifically.

Figure 3A:
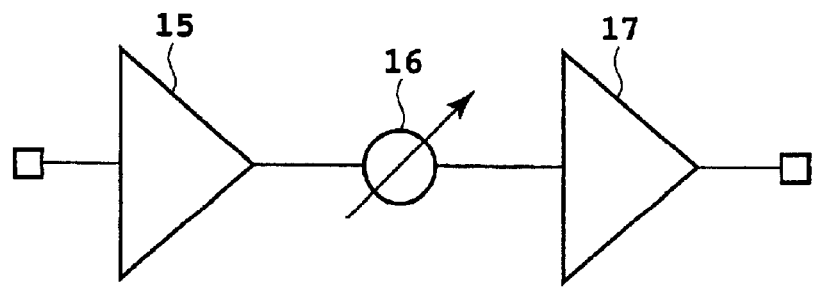
FIG. 3A is a block diagram showing the configuration of a conventional optical amplifier.

Referring to FIG. 3A, there is shown a block diagram of a prior art device for optical amplification. This device is configured by cascading an EDFA (erbium doped fiber amplifier) 15, an optical variable attenuator 16, and an EDFA 17.

Figure 3B:
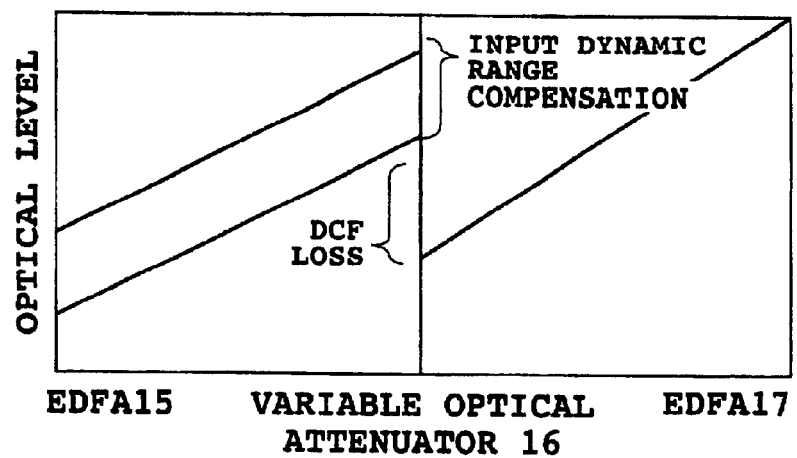
FIG. 3B is a level diagram in the optical amplifier shown in FIG. 3A.

FIG. 3B shows a level diagram in the device shown in FIG. 3A. In each of the EDFAs 15 and 17, gain fixing control is performed to maintain the wavelength characteristic of gain constant. As a result, the output power of the EDFA 15 becomes 9 dBm/ch, and a pump light power of about 800 mW at the maximum is therefore required.

Thus, the pump light power can be reduced to a substantially half value according to the preferred embodiment shown in FIG. 1 as compared with that in the prior art, thereby greatly reducing the cost of the pump source 3 in the first optical amplifying unit 13.

Figure 4:
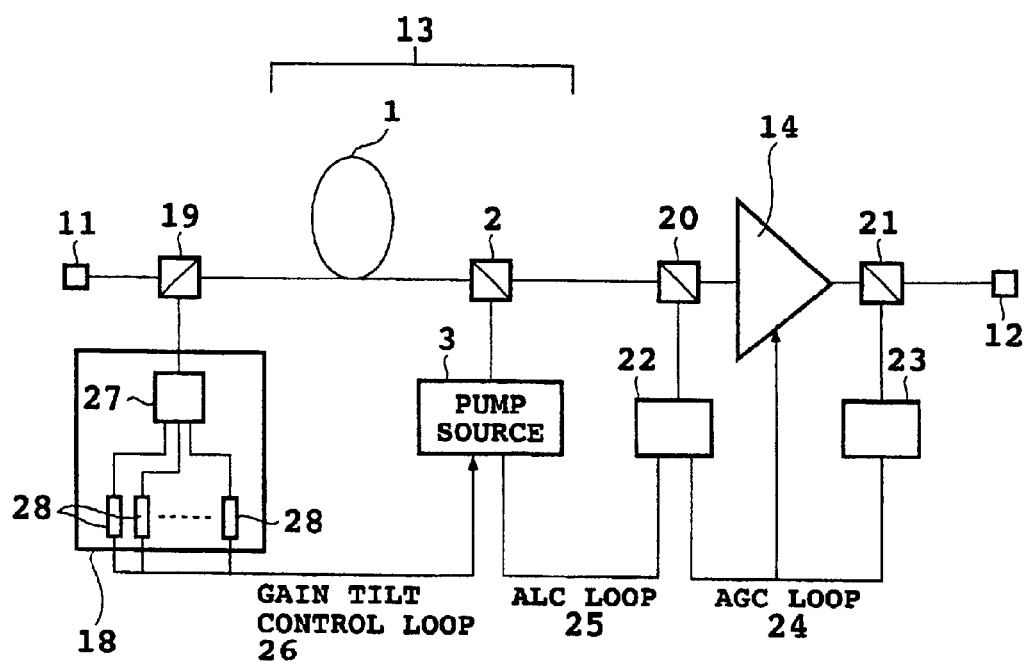
FIG. 4 is a block diagram showing a second preferred embodiment of the device for optical amplification according to the present invention.

Referring to FIG. 4, there is shown a second preferred embodiment of the device for optical amplification according to the present invention. In contrast to the preferred embodiment shown in FIG. 1, the preferred embodiment shown in FIG. 4 is characterized in that a spontaneous Raman scattering light monitor unit 18, optical couplers 19, 20, and 21, power monitors 22 and 23, AGC loop 24, ALC loop 25, and gain tilt control loop 26 are additionally provided.

The optical coupler 19 is used to branch off spontaneous Raman scattering light generated from the second end of the Raman amplifying medium 1 toward the first end thereof, from the main optical path. The spontaneous Raman scattering light branched off is supplied to the monitor unit 18. The monitor unit 18 includes an optical demultiplexer 27 for separating the Raman scattering light into a plurality of different wavelength components, and a plurality of power monitors 28 for detecting the powers of the wavelength components output from the optical demultiplexer 27. The number of the power monitors 28 is set equal to the number of wavelengths of the pump light in the pump source 3.

The optical coupler 20 is used to branch off a part of signal light to be supplied from the first optical amplifying unit 13 to the second optical amplifying unit 14. The signal light branched off by the optical coupler 20 is supplied to the power monitor 22. The optical coupler 21 is used to branch off a part of signal light output from the second optical amplifying unit 14. The signal light branched off by the optical coupler 21 is supplied to the power monitor 23. Accordingly, the gain in the second optical amplifying unit 14 can be calculated according to the outputs from the power monitors 22 and 23. The AGC loop 24 controls the second optical amplifying unit 14 according to the gain calculated above so that the gain in the second optical amplifying unit 14 becomes constant. More specifically, the AGC loop 24 controls the powers (power) of the pump sources 5 and/or 8 (see FIG. 1) in the second optical amplifying unit 14.

The ALC loop 25 controls the pump source 3 so that the output from the power monitor 22 becomes constant. More specifically, the ALC loop 25 controls the total output power in the pump source 3.

The gain tilt control loop 26 controls the pump source 3 according to the outputs from the spontaneous Raman scattering light monitor unit 18. More specifically, the gain tilt control loop 26 controls the power balance among the plural wavelengths in the pump source 3 so that the gain tilt calculated according to data obtained in the monitor unit 18 becomes constant.

Accordingly, the ALC loop 25 constitutes a control unit in this preferred embodiment.

Figure 5:
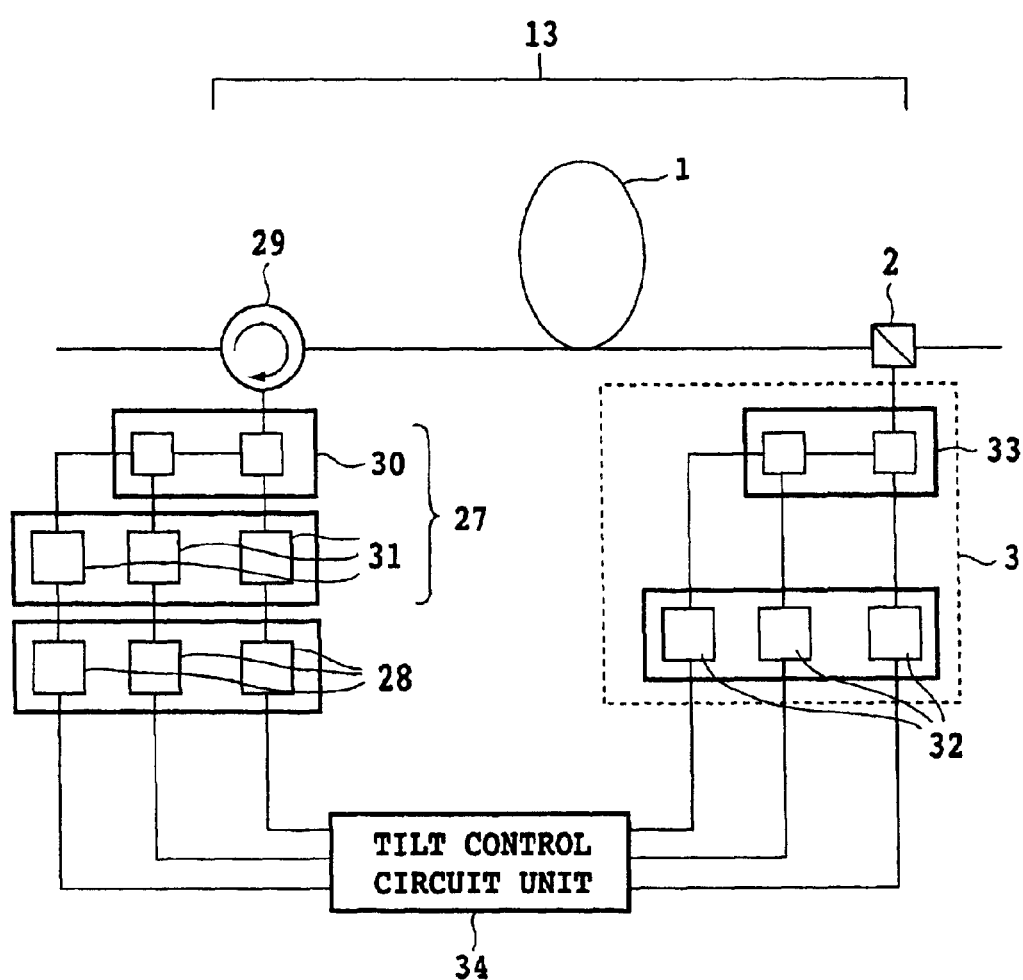
FIG. 5 is a block diagram showing a specific configuration of a gain tilt control loop 26 shown in FIG. 4.

Referring to FIG. 5, there is shown a specific configuration of the gain tilt control loop 26. In this configuration, an optical circulator 29 is used in place of the optical coupler 19.

The spontaneous Raman scattering light output from the optical circulator 29 is divided into three outputs by an optical branch unit 30. These three outputs are supplied to three bandpass filters 31 having different transmission center wavelengths, respectively. The outputs from the three bandpass filters 31 are supplied to three power monitors 28, respectively. In each power monitor 28, the optical input is converted into an electrical signal. The optical branch unit 30 and the bandpass filters 31 constitute the optical demultiplexer 27 (see FIG. 4).

The pump source 3 is composed of three LDs (laser diodes) 32 and an optical multiplexer (MUX) 33 for combining the outputs from the three LDs 32. The output from the optical multiplexer 33 is supplied through the optical coupler 2 to the Raman amplifying medium 1.

A tilt control circuit unit 34 is provided to control the balance of drive currents for the LDs 32 according to the outputs from the power monitors 28 so that the outputs from the power monitors 28 become substantially the same value.

The passband of each bandpass filter 31 shown in FIG. 5 will now be described with reference to FIG. 6. The spectrum of the backward spontaneous Raman scattering light has three peaks whose wavelengths are respectively shifted from the operating wavelengths of the three LDs toward longer wavelengths by about 13.2 THz. Accordingly, the passbands of the three bandpass filters 31 are set so as to coincide with the three peaks, respectively. Accordingly, the tilt control circuit unit 34 controls the LDs 32 according to the outputs from the power monitors 28 so that they become constant as described above with reference to FIG. 5, thereby maintaining constant the gain tilt in the first optical amplifying unit 13.

Figure 6:
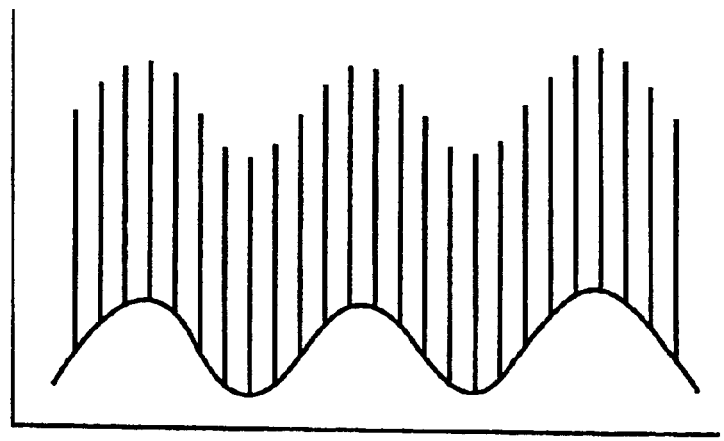
FIG. 6 is a diagram for illustrating the passbands of bandpass filters 31 shown in FIG. 5.
Figure 6:
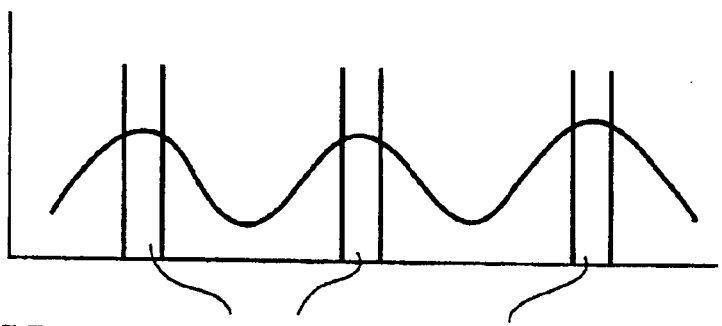

The diagram shown on the upper side in FIG. 6 is an example of the output spectrum of the first optical amplifying unit 13. The diagram shown on the down side in FIG. 6 is an example of the backward spontaneous Raman scattering light spectrum. The band-pass filter 31 extracts light having wavelengths included in the gain peak band of the pumping LDs 32.

Figure 7:
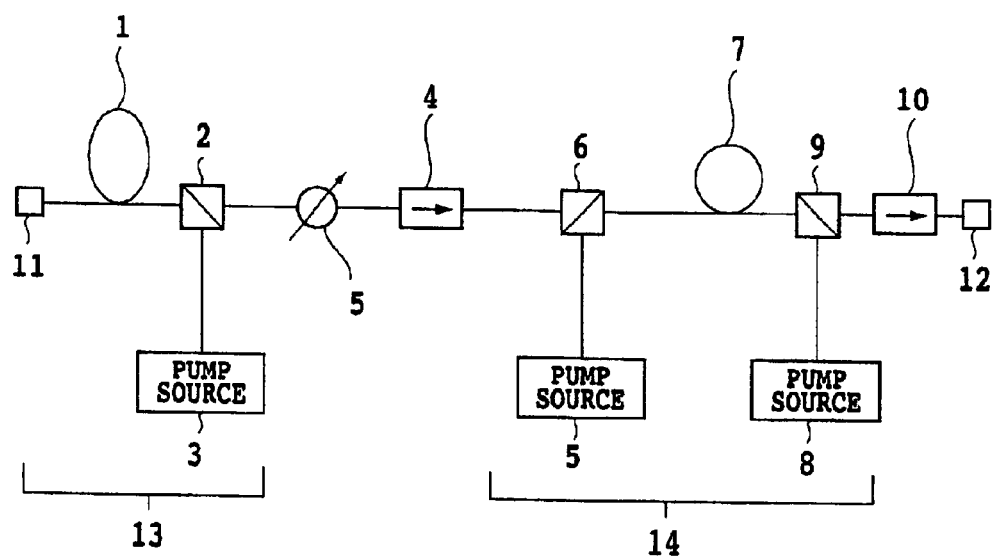
FIG. 7 is a block diagram showing a third preferred embodiment of the device for optical amplification according to the present invention.

Referring to FIG. 7, there is shown a third preferred embodiment of the device for optical amplification according to the present invention. In contrast to the preferred embodiment shown in FIG. 1, the preferred embodiment shown in FIG. 7 is characterized in that a variable optical attenuator 35 is additionally provided between the first optical amplifying unit 13 and the second optical amplifying unit 14.

In the preferred embodiment shown in FIG. 1, when the power of signal light to be supplied to the input port 11 changes, the ripple in the output spectrum of the first optical amplifying unit 13 increases according to variations in gain of the first optical amplifying unit 13. More specifically, when the input power of signal light increases by 10 dB/ch, a ripple of about 0.7 dB is generated.

In the preferred embodiment shown in FIG. 7, when the gain control amount in the first optical amplifying unit 13 reaches a given value, variations in the input power of signal light are absorbed by the variable optical attenuator 35. Accordingly, the power of signal light to be input to the second optical amplifying unit 14 can be maintained constant.

Figure 8A:
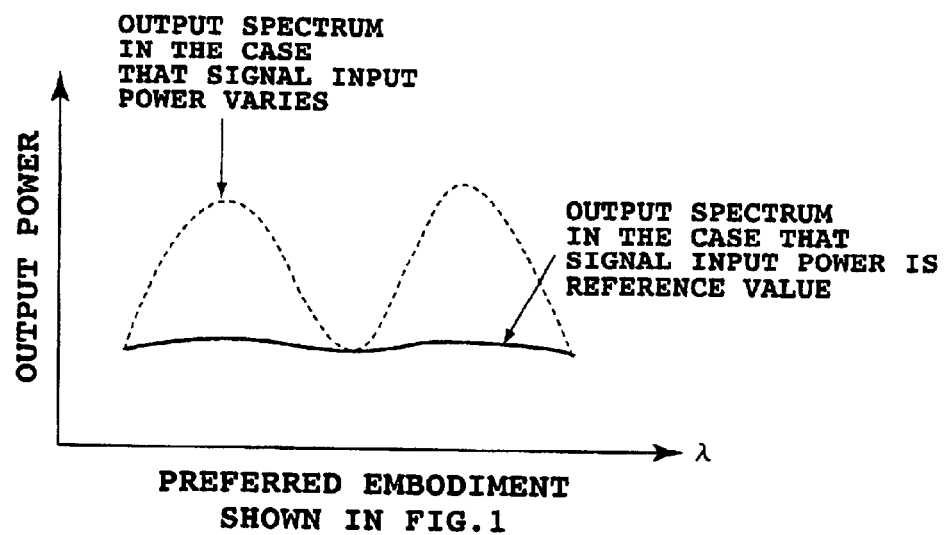
FIG. 8A is a graph showing the wavelength characteristic of output power in the preferred embodiment shown in FIG. 1.
Figure 8B:
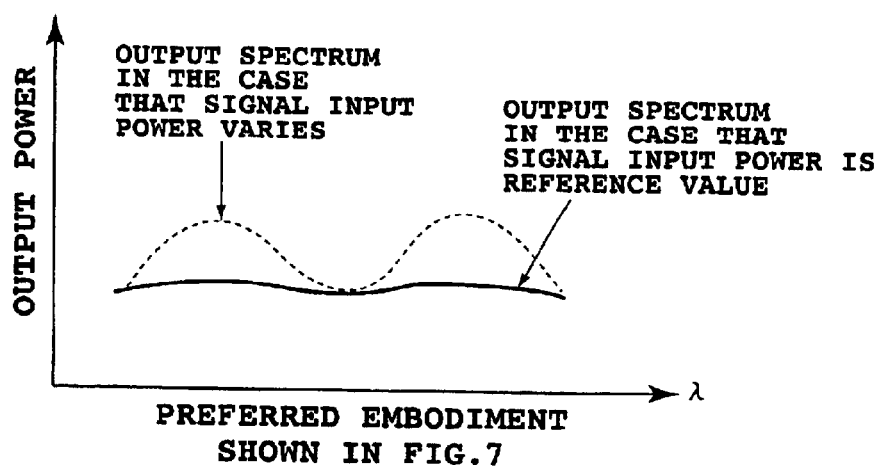
FIG. 8B is a graph showing the wavelength characteristic of output power in the preferred embodiment shown in FIG. 7.

FIGS. 8A and 8B show the output spectra in the preferred embodiments shown in FIGS. 1 and 7, respectively. In each figure, the vertical axis represents output power and the horizontal axis represents wavelength. In the preferred embodiment shown in FIG. 1, the ripple in the output spectrum in the case of variations in signal input power is relatively large. In contrast thereto, it is apparent from FIG. 8B that in the preferred embodiment shown in FIG. 7 the ripple in the output spectrum is relatively small even when the same variations in signal input power occur. Thus, the preferred embodiment shown in FIG. 7 can meet the requirement that an interchannel deviation of repeater output is to be suppressed to a given value or less.

In each of the preferred embodiments shown in FIGS. 1 and 7, when the signal input power is a reference value, almost no ripples are generated.

Figure 9:
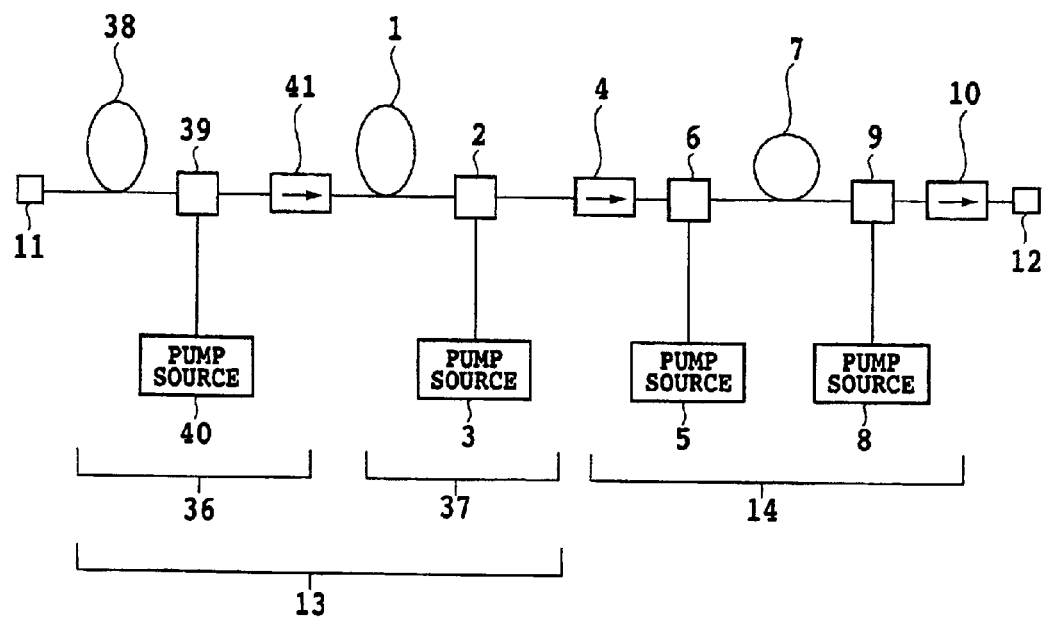
FIG. 9 is a block diagram showing a fourth preferred embodiment of the device for optical amplification according to the present invention.

Referring to FIG. 9, there is shown a fourth preferred embodiment of the device for optical amplification according to the present invention. This preferred embodiment is characterized in that the first optical amplifying unit 13 is divided into a front stage 36 and a rear stage 37. The rear stage 37 has the same configuration as that of the first optical amplifying unit 13 shown in FIG. 1. The front stage 36 includes a Raman amplifying medium 38, an optical coupler 39, and a pump source 40 respectively corresponding to the Raman amplifying medium 1, the optical coupler 2, and the pump source 3. The Raman amplifying medium 38 has a first end connected to the input port 11 and a second end connected to the optical coupler 39. Pump light from the pump source 40 is supplied through the optical coupler 39 into the Raman amplifying medium 39 from its second end and propagates toward the first end of the Raman amplifying medium 38. An optical isolator 41 is provided between the front stage 36 and the rear stage 37. The optical isolator 41 has an input end connected to the optical coupler 39 and an output end connected to the first end of the Raman amplifying medium 1.

A dispersion compensating fiber may be used as either or both of the Raman amplifying media 1 and 38. In the case that a dispersion compensating fiber is used as both of the Raman amplifying media 1 and 38, the degree of freedom to the compensation for the chromatic dispersion and dispersion slope in an optical fiber transmission line can be enlarged. Further, since the first optical amplifying unit 13 is divided into the front stage 36 and the rear stage 37 in this preferred embodiment, not only the pump source 3 but also the pump source 40 can be used as a control object in the case of applying the gain tilt control loop 26 and the ALC loop 25 shown in FIG. 4 to the preferred embodiment shown in FIG. 9, so that two independent controls can be easily performed.

Figure 10:
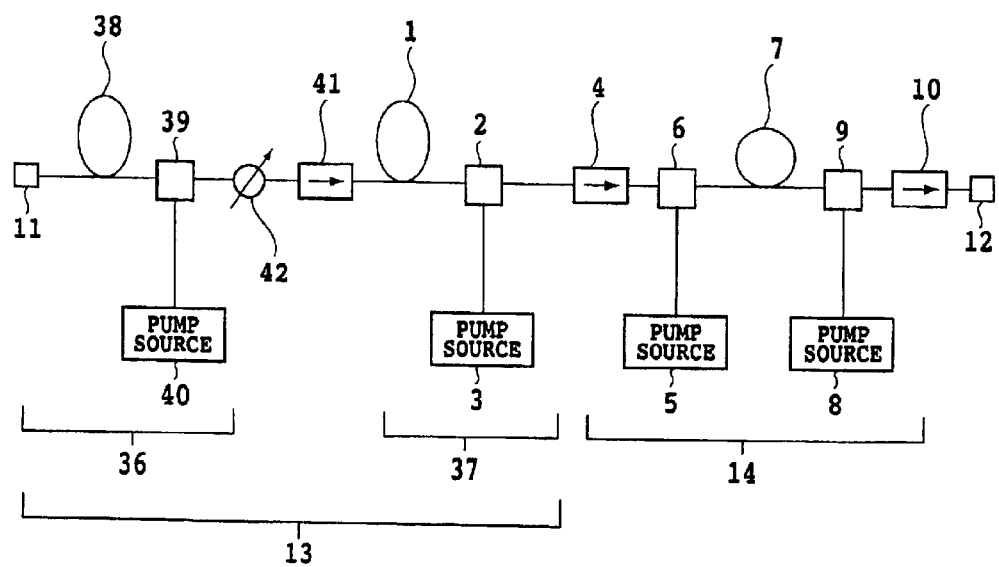
FIG. 10 is a block diagram showing a fifth preferred embodiment of the device for optical amplification according to the present invention.

Referring to FIG. 10, there is shown a fifth preferred embodiment of the device for optical amplification according to the present invention. In contrast to the preferred embodiment shown in FIG. 9, the preferred embodiment shown in FIG. 10 is characterized in that a variable optical attenuator 42 is additionally provided between the front stage 36 of the first optical amplifying unit 13 and the optical isolator 41. According to this preferred embodiment, not only the effect obtained by the preferred embodiment shown in FIG. 9, but also the effect of suppressing the ripple in the output spectrum as described with reference to FIG. 7 can be obtained.

Figure 11:
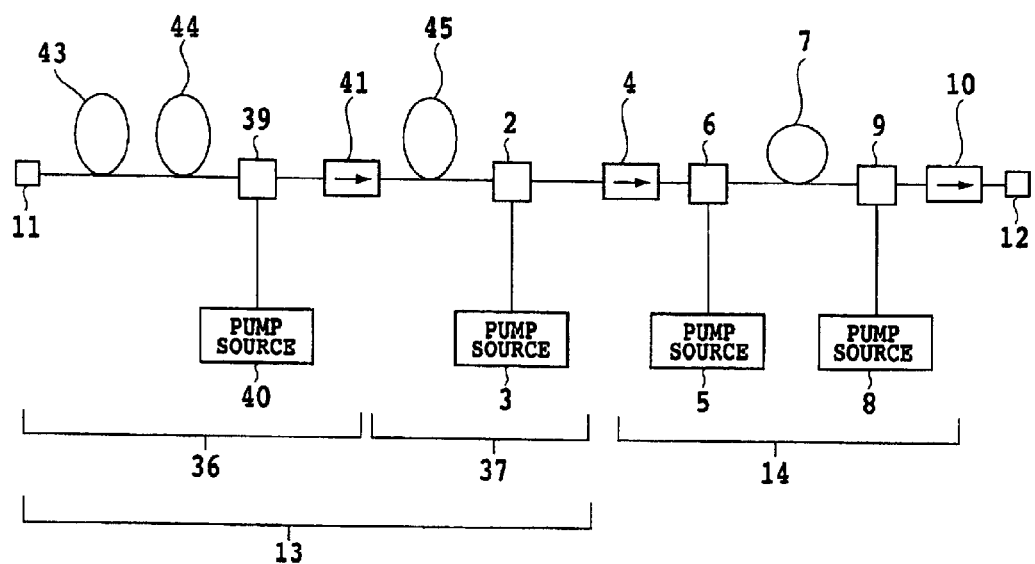
FIG. 11 is a block diagram showing a sixth preferred embodiment of the device for optical amplification according to the present invention.

Referring to FIG. 11, there is shown a sixth preferred embodiment of the device for optical amplification according to the present invention. In contrast to the preferred embodiment shown in FIG. 9, the preferred embodiment shown in FIG. 11 is characterized in that a dispersion compensating fiber 45 is used as the Raman amplifying medium 1 and that a positive dispersion fiber 43 and a negative dispersion fiber 44 cascaded thereto are used as the Raman amplifying medium 38.

The positive dispersion fiber 43 and the negative dispersion fiber 44 give positive chromatic dispersion and negative chromatic dispersion to signal light, respectively. The lengths of the positive dispersion fiber 43 and the negative dispersion fiber 44 are set so that the chromatic dispersion and dispersion slope in the front stage 36 of the first optical amplifying unit 13 become zero and that a required gain is obtained.

When the transmission speed per channel becomes tens of gigabits per second or more, the chromatic dispersion and dispersion slope in an optical fiber transmission line must be compensated with high accuracy. According to this preferred embodiment, the chromatic dispersion in the front stage 36 is adjusted to 0 ps/nm, thereby eliminating the need for giving an extra chromatic dispersion to the dispersion compensating fiber 45 for compensating the dispersion in the optical fiber transmission line. As a result, the device can be easily designed.

Figure 12:
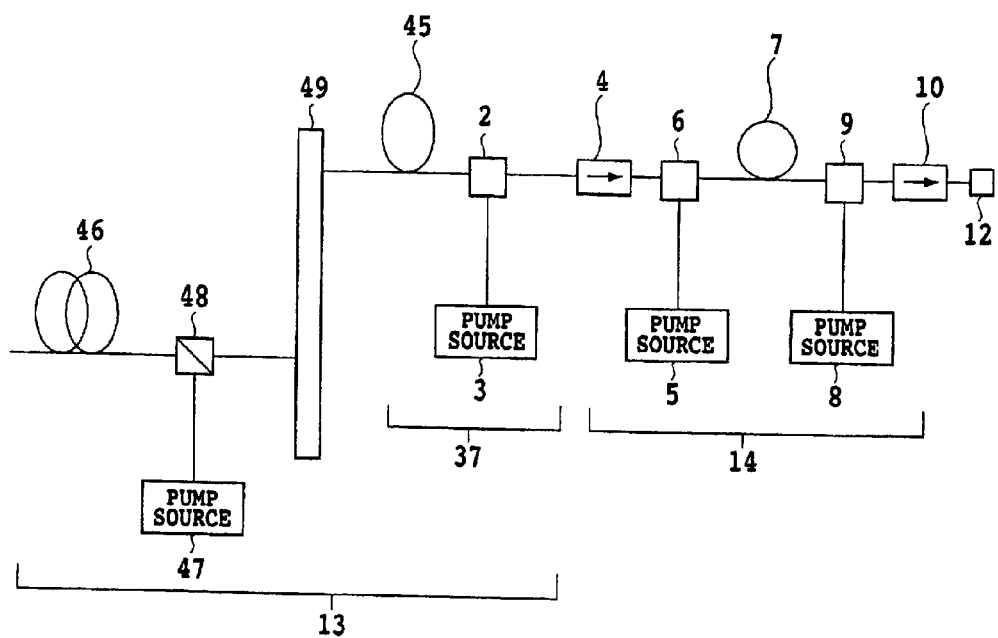
FIG. 12 is a block diagram showing a seventh preferred embodiment of the device for optical amplification according to the present invention.

Referring to FIG. 12, there is shown a seventh preferred embodiment of the device for optical amplification according to the present invention. This preferred embodiment is characterized in that an upstream optical fiber transmission line 46 is utilized as a part of a distribution constant type Raman amplifier.

To this end, pump light output from a pump source 47 is supplied through an optical coupler 48 into the optical fiber transmission line 46 from its output end. In general, an SMF (single-mode fiber) or NZ-DSF (nonzero-dispersion shifted fiber) is used as the optical fiber transmission line 46. The pump light from the pump source 47 is set according to the kind of the optical fiber transmission line 46 and the band of signal light. By supplying the pump light having a suitable wavelength into the optical fiber transmission line 46 from its output end, the signal light propagating in the optical fiber transmission line 46 in a direction opposite to the propagation direction of the pump light is amplified. The signal light amplified in the optical fiber transmission line 46 is next supplied through the optical coupler 48 into an optical demultiplexer (DMUX) 49. By using the optical demultiplexer 49, the signal light can be divided into three bands of the S-band, C-band, and L-band, for example. Then, the devices for optical amplification according to the present invention can be applied in parallel to these three bands.

In this preferred embodiment, the rear stage 37 of the first optical amplifying unit 13 and the second optical amplifying unit 14 shown in FIG. 11 are applied to one of the divided bands.

Accordingly, a difference in loss according to the length and kind of the optical fiber transmission line 46 can be absorbed by either the Raman amplifier including the optical fiber transmission line 46 or the rear stage 37 or both of them, so that the input power of signal light to be supplied to the second optical amplifying unit 14 can be maintained constant. Accordingly, the Raman amplifier including the optical fiber transmission line 46 is considered to correspond to the front stage 36 of the first optical amplifying unit 13 shown in FIG. 11.

Figure 13:
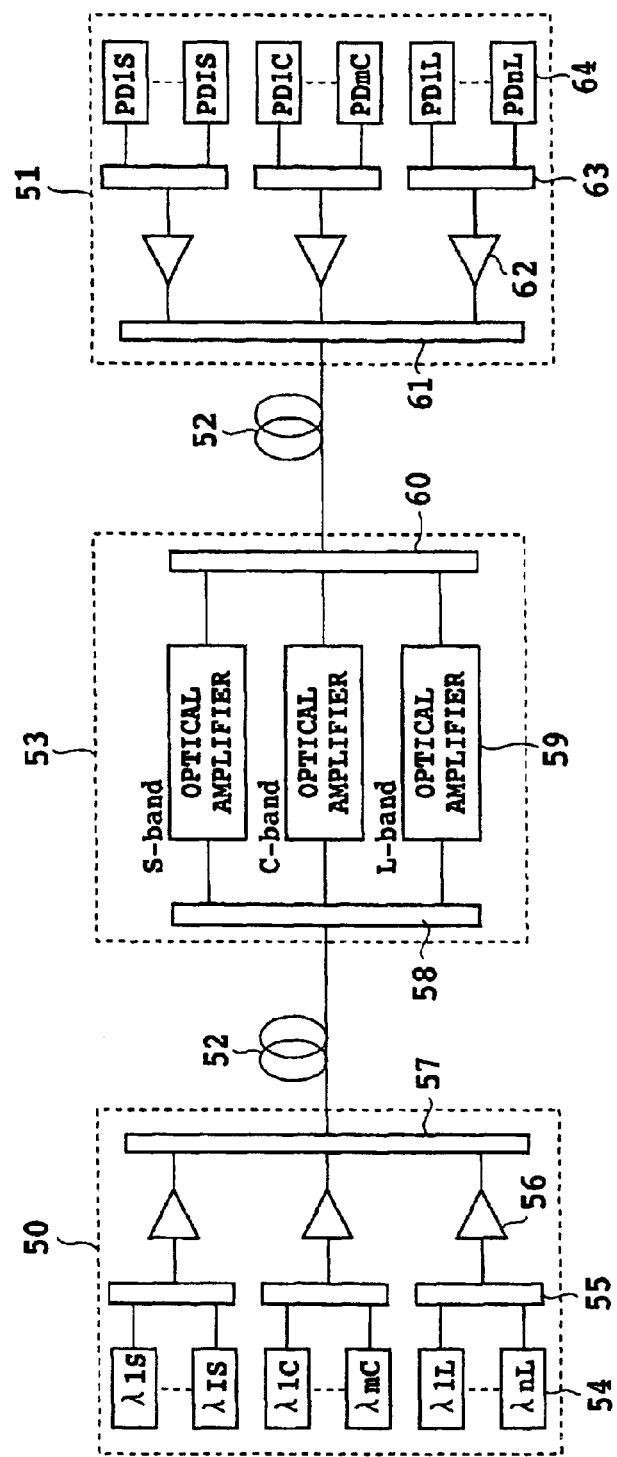
FIG. 13 is a block diagram of a system to which the present invention is applicable.

Referring to FIG. 13, there is shown a preferred embodiment of a system to which the present invention is applicable. This system includes an optical transmitter 50, an optical receiver 51, an optical fiber transmission line 52 connecting the optical transmitter 50 and the optical receiver 51, and at least one optical repeater 53 arranged along the optical fiber transmission line 52. In this preferred embodiment, optical amplification of WDM signal light in each of the S-band, C-band, and L-band is described.

In the optical transmitter 50, a plurality of laser diodes 54 are allocated to optical signals in each band, and the optical signals from the laser diodes 54 are wavelength division multiplexed by an optical multiplexer 55 for each band to obtain WDM signal light. The WDM signal light from each optical multiplexer 55 is amplified by an optical amplifier 56 to enter an optical multiplexer 57. In the optical multiplexer 57, the WDM signal light in the S-band, the WDM signal light in the C-band, and the WDM signal light in the L-band are wavelength division multiplexed to obtain WDM signal light including the S-band, C-band, and L-band. The WDM signal light from the optical multiplexer 57 is transmitted to the optical repeater 53 by the optical fiber transmission line 52.

In the optical repeater 53, the WDM signal light received is divided into the WDM signal light in the S-band, the WDM signal light in the C-band, and the WDM signal light in the L-band by an optical demultiplexer 58. The WDM signal light in each band is amplified by an optical amplifier 59 to which the present invention is applicable, next entering an optical multiplexer 60. In the optical multiplexer 60, the WDM signal light in the S-band, the WDM signal light in the C-band, and the WDM signal light in the L-band are wavelength division multiplexed again to obtain WDM signal light. The WDM signal light from the optical multiplexer 60 is transmitted to the optical receiver 51 by the optical fiber transmission line 52.

In the optical receiver 51, the WDM signal light received is divided into the WDM signal light in the S-band, the WDM signal light in the C-band, and the WDM signal light in the L-band by an optical demultiplexer 61. The WDM signal light in each band is amplified by an optical amplifier 62, and is next divided into the individual optical signals by an optical demultiplexer 63 for each band. Each optical signal is converted into an electrical signal by a photodetector 64 to regenerate transmitted data.

In this preferred embodiment, the present invention is applicable to each of the S-band, C-band, and L-band in the optical repeater 53. Accordingly, the wavelength characteristic of gain can be maintained constant and a wide input dynamic range can be obtained in a greatly wide band.

Figure 14:
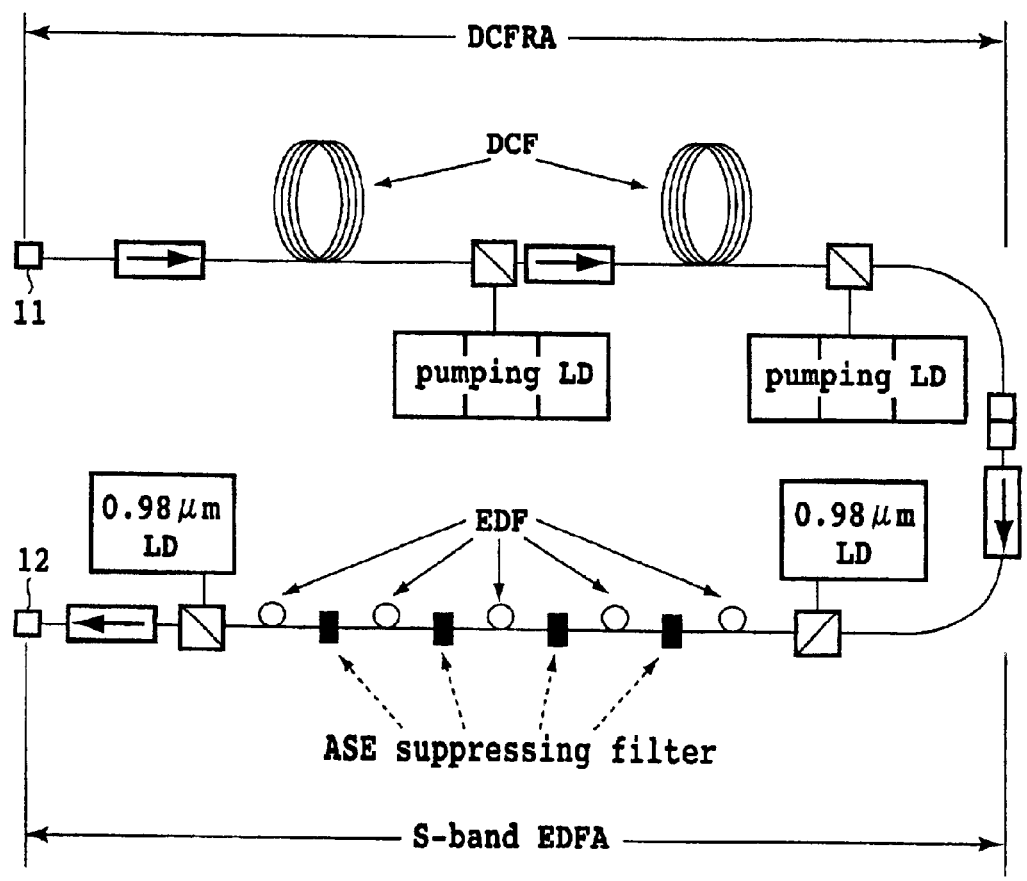
FIG. 14 is a block diagram showing an experimental device for verification of the effectiveness of the present invention.

Referring to FIG. 14, there is shown a block diagram of an experimental device for verification of the effectiveness of the present invention. A DCFRA (dispersion compensating fiber Raman amplifier) as the first optical amplifying unit 13 and an S-band EDFA (erbium doped fiber amplifier for the S-band) corresponding to the second optical amplifying unit 14 are provided between the input port 11 and the output port 12. In the DCFRA, two DCFs (dispersion compensating fibers) are used as the Raman amplifying medium, and two pumping LDs (pumping laser diodes) are used as the pump sources for backward pumping the two DCFs, respectively. In the EDFA, two 0.98-$\mu$m LDs are used as the pump sources for forward and backward pumping an EDF. Further, optical isolators are suitably provided in necessary paths.

In the EDFA, a plurality of (e.g., four) ASE suppressing filters each for blocking ASE (amplified spontaneous emission noise) generated in the C-band and transmitting pump light in the 0.98-$\mu$m band are arranged along the EDF. With this configuration, optical amplification for the S-band with the use of the EDF can be performed.

In the DCFRA, a desired wavelength characteristic of gain can be obtained by adjusting power distribution at each pumping wavelength, and an input dynamic range can be absorbed by adjusting the total pump power. In the EDFA, the number of stages of the EDF is preferably set to an optimum value according to the gain of the EDFA. For example, the optimum number of stages of the EDF in the case of obtaining a gain of about 20 dB is 5 from the viewpoints of efficiency and noise.

Figure 15:
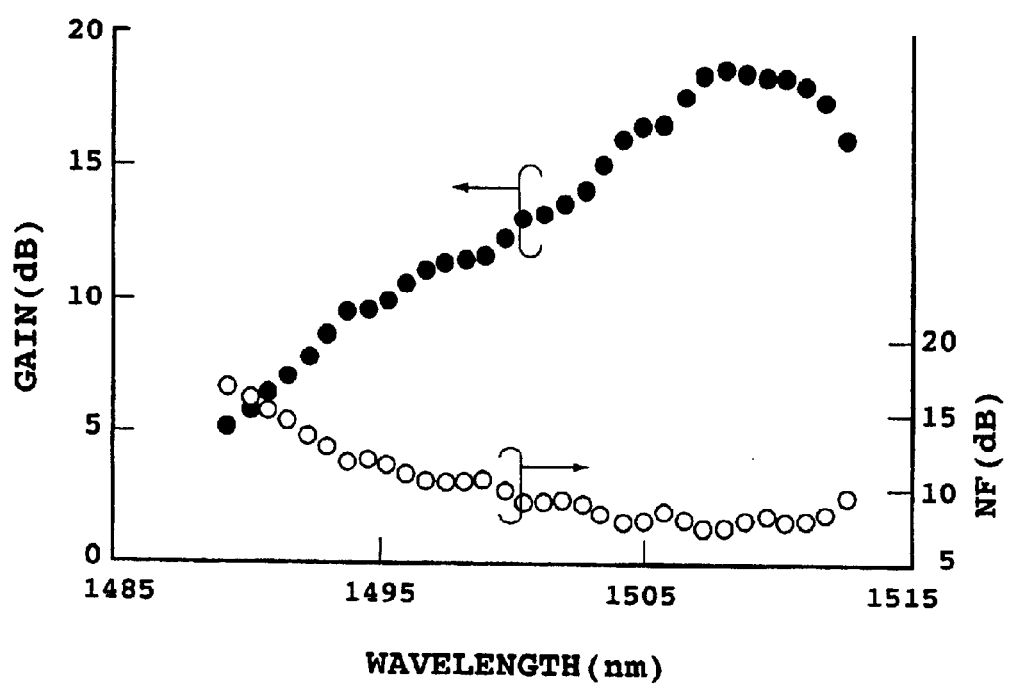
FIG. 15 is a graph showing the wavelength characteristics of gain and NF in an EDFA shown in FIG. 14.

Referring to FIG. 15, there are shown the wavelength characteristics of gain and NF (noise figure) in the EDFA shown in FIG. 14. As apparent from FIG. 14, the gain has a wavelength dependence of 15 dB, and the noise figure has a wavelength dependence of 10 dB. To compensate for these wavelength dependences in the case of amplifying signal light by using the EDFA only, the pump power and its distribution in the DCFRA were adjusted in this experiment.

Figure 16:
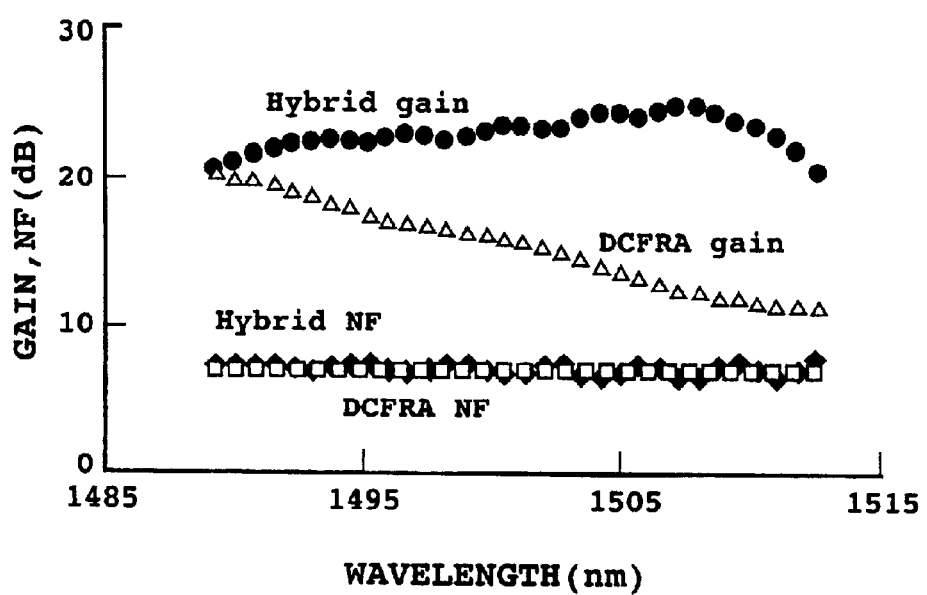
FIG. 16 is a graph showing the wavelength characteristics of gain and NF in the whole device and a DCFRA shown in FIG. 14.

Referring to FIG. 16, there are shown the wavelength characteristics of gain and NF in the whole device and the DCFRA shown in FIG. 14. In FIG. 16, "Hybrid gain" represents the wavelength characteristic of gain in the whole device, "DCFRA gain" represents the wavelength characteristic of gain in the DCFRA only, "Hybrid NF" represents the wavelength characteristic of NF in the whole device, and "DCFRA NF" represents the wavelength characteristic of NF in the DCFRA only.

By effectively combining the DCFRA and the EDFA, the wavelength characteristic of gain in the whole device can be suppressed to about 5 dB, and the wavelength characteristic of NF in the whole device can be made substantially flat.

The configuration of the Raman scattering light monitor on the signal light input side of the first optical amplifying unit 13 shown in FIG. 4 and the configuration shown in FIG. 5 may be used as a monitor for gain control of the first optical amplifying unit 13 shown in FIG. 7, the first optical amplifying unit 13 (the front stage 36 and the rear stage 37) shown in FIG. 9, the first optical amplifying unit 13 (the front stage 36 and the rear stage 37) shown in FIG. 10, the first optical amplifying unit 13 (the front stage 36 and the rear stage 37) shown in FIG. 11, the first optical amplifying unit 13 (the front stage 36 (the portion consisting of the optical fiber transmission line 46, the pump source 47, and the optical coupler 48) and the rear stage 37) shown in FIG. 12, and the DCFRA shown in FIG. 14.

According to the present invention as described above, it is possible to maintain the wavelength characteristic of gain constant and obtain a wide input dynamic range. Furthermore, in this condition, the attenuation of a variable optical attenuator that may be sometimes provided in the device for optical amplification can be reduced or nullified, thereby allowing the improvement in amplification efficiency and in noise characteristics.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A device comprising:
    a first optical amplifying unit comprising a Raman amplifying medium and a first pump source for pumping said Raman amplifying medium, for amplifying signal lights propagated through said Raman amplifying medium in one direction, said first pump source outputting a plurality of pump lights having different wavelengths;
    a second optical amplifying unit optically connected to a rear stage of said first optical amplifying unit, said second optical amplifying unit comprising an optical amplifying medium and a second pump source for pumping said optical amplifying medium; and
    a control unit for controlling the gain of said first optical amplifying unit so as to cancel variations in output power of said first optical amplifying unit due to variations in input power of said first optical amplifying unit;
    means for detecting the spectrum of spontaneous Raman scattering light generated in an propagated through said Raman amplifying medium in the other direction; and
    means for controlling a balance of power of said plurality of pump lights according to the spectrum of said spontaneous Raman scattering light detected.

2. A device according to claim 1, wherein said Raman amplifying medium comprises an optical fiber, and said optical amplifying medium comprises an erbium doped fiber.

3. A device according to claim 1, wherein said control unit comprises means for detecting the power of light output from said first optical amplifying unit, and means for controlling a total power of said plurality of pump lights so that the power detected by said detecting means becomes constant.

4. A device according to claim 1, further comprising means for detecting the optical input power and optical output power of said second optical amplifying unit, and means for controlling said second pump source according to the optical input power and optical output power detected by said detecting means so that the gain of said second optical amplifying unit becomes constant.

5. A device according to claim 1, further comprising a variable optical attenuator connected between said first optical amplifying unit and said second optical amplifying unit.

6. A device according to claim 1, wherein said Raman amplifying medium comprises first and second Raman amplifying media cascaded to each other, and said first pump source comprises first and second light sources for pumping said first and second Raman amplifying media, respectively.

7. A device according to claim 6, wherein said first Raman amplifying medium comprises a positive dispersion fiber and a negative dispersion fiber cascaded to each other, and said second Raman amplifying medium comprises a dispersion compensating fiber.

8. A device according to claim 6, wherein said first Raman amplifying medium comprises a part or the whole of an optical fiber transmission line.

9. A device according to claim 1, wherein said optical amplifying medium comprises a rare earth doped fiber.

10. A device according to claim 9, wherein said rare earth doped fiber contains at least one rare earth element selected from Er, Nd, Tm, Pr, Yb, and Dy.

11. A method comprising:
    amplifying signal lights by a first optical amplifying unit comprising a Raman amplifying medium and a first pump source for pumping said Raman amplifying medium, said signal lights propagated through said Raman amplifying medium in one direction, said first pump source outputting a plurality of pump lights having different wavelengths;
    amplifying signal light output from said first optical amplifying unit by a second optical amplifying unit comprising an optical amplifying medium and a second pump source for pumping said optical amplifying medium;
    controlling the gain of said first optical amplifying unit so as to cancel variations in output power of said first optical amplifying unit due to variations in input power of said first optical amplifying unit;
    detecting a spectrum of spontaneous Raman scattering light generated in and propagated through said Raman amplifying medium in the other direction; and
    controlling a balance of power of said plurality of pump lights according to a spectrum of said spontaneous Raman scattering light detected.

12. A method according to claim 11, wherein said Raman amplifying medium comprises an optical fiber, and said optical amplifying medium comprises an erbium doped fiber.

13. A method according to claim 11, wherein said controlling the gain of said first optical amplifying unit comprises detecting the power of light output from said first optical amplifying unit, and controlling a total power of said plurality of pump lights so that the power detected becomes constant.

14. A method according to claim 11, further comprising detecting the optical input power and optical output power of said second optical amplifying unit, and controlling said second pump source according to the optical input power and optical output power detected so that the gain of said second optical amplifying unit becomes constant.

15. A method according to claim 11, further comprising providing a variable optical attenuator connected between said first optical amplifying unit and said second optical amplifying unit.

16. A method according to claim 11, wherein said Raman amplifying medium comprises first and second Raman amplifying media cascaded to each other, and said first pump source comprises first and second light sources for pumping said first and second Raman amplifying media, respectively.

17. A method according to claim 16, wherein said first Raman amplifying medium comprises a positive dispersion fiber and a negative dispersion fiber cascaded to each other, and said second Raman amplifying medium comprises a dispersion compensating fiber.

18. A method according to claim 16, wherein said first Raman amplifying medium comprises a part or the whole of an optical fiber transmission line.

19. A method according to claim 11, wherein said optical amplifying medium comprises a rare earth doped fiber.

20. A method according to claim 19, wherein said rare earth doped fiber contains at least one rare earth element selected from Er, Nd, Tm, Pr, Yb, and Dy.

21. A device comprising:
    a first optical amplifying unit for amplifying signal lights, comprising a Raman amplifying medium and a first pump source, optically connected to said Raman amplifying medium at a downstream side thereof, for pumping said Raman amplifying medium, said signal light being input from an upstream side thereof;
    a second optical amplifying unit optically connected to a rear stage of said first optical amplifying unit, said second optical amplifying unit comprising an optical amplifying medium and a second pump source for pumping said optical amplifying medium; and
    means for detecting the spectrum of spontaneous Raman scattering light generated in said Raman amplifying medium, said spontaneous Raman scattering light being extracted from the Raman amplifying medium at the upstream side separate from said signal lights.

22. A device comprising:
    a first optical amplifying unit comprising a Raman amplifying medium and a first pump source for pumping said Raman amplifying medium, for amplifying signal lights propagated through said Raman amplifying medium in one direction, said first pump source outputting a plurality of pump lights having different wavelengths;
    means for detecting a spectrum of spontaneous Raman scattering light generated in and propagated through said Raman amplifying medium in the other direction; and
    means for controlling a balance of power of said plurality of pump lights according to the spectrum of said spontaneous Raman scattering light detected.

* * * * *